March 19, 1935. A. S. HOWELL 1,994,913
FILM MEASURING AND SPLICING MACHINE
Filed Aug. 25, 1931 5 Sheets-Sheet 1

Inventor:
Albert S. Howell
By: Miehle & Miehle,
Atty's.

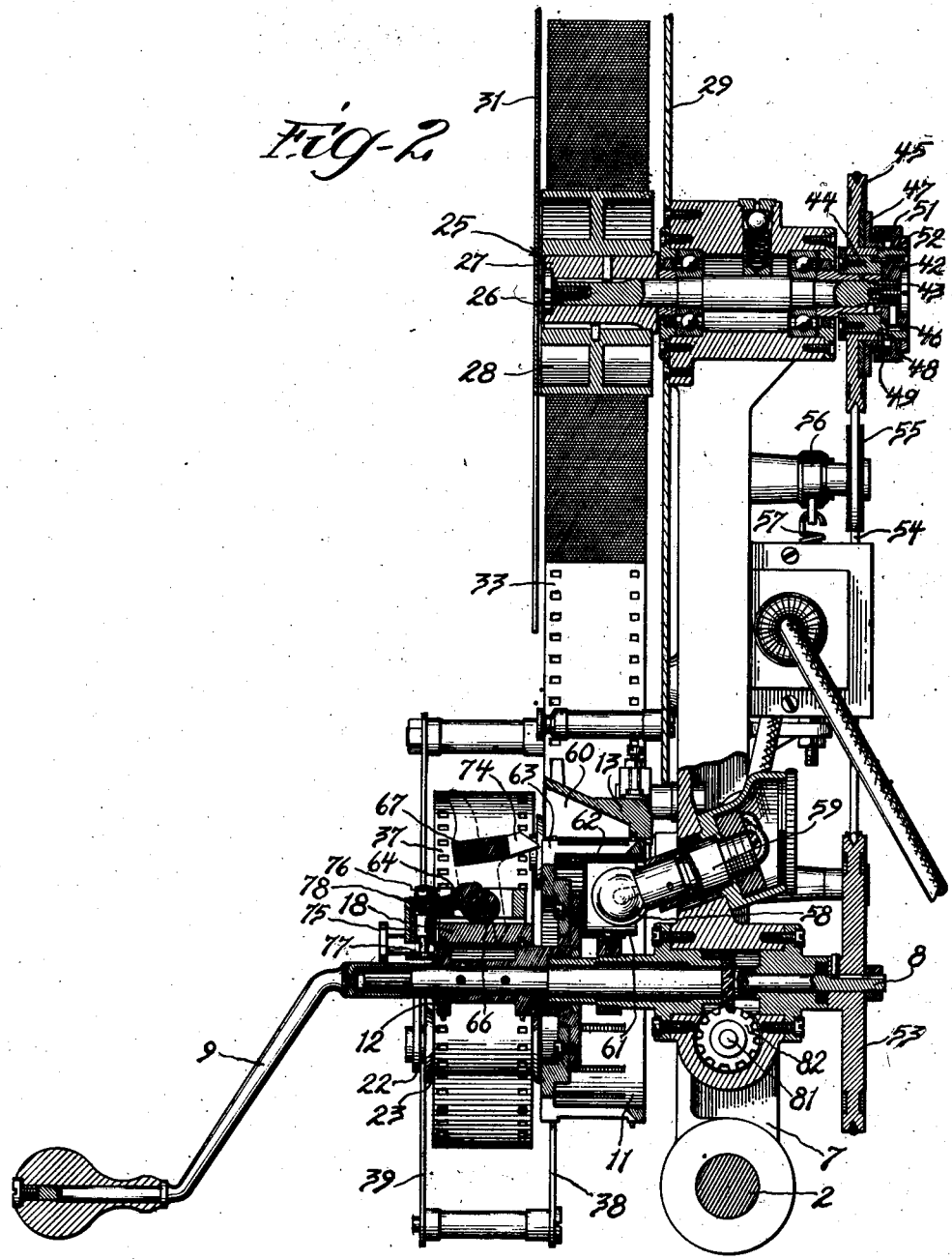

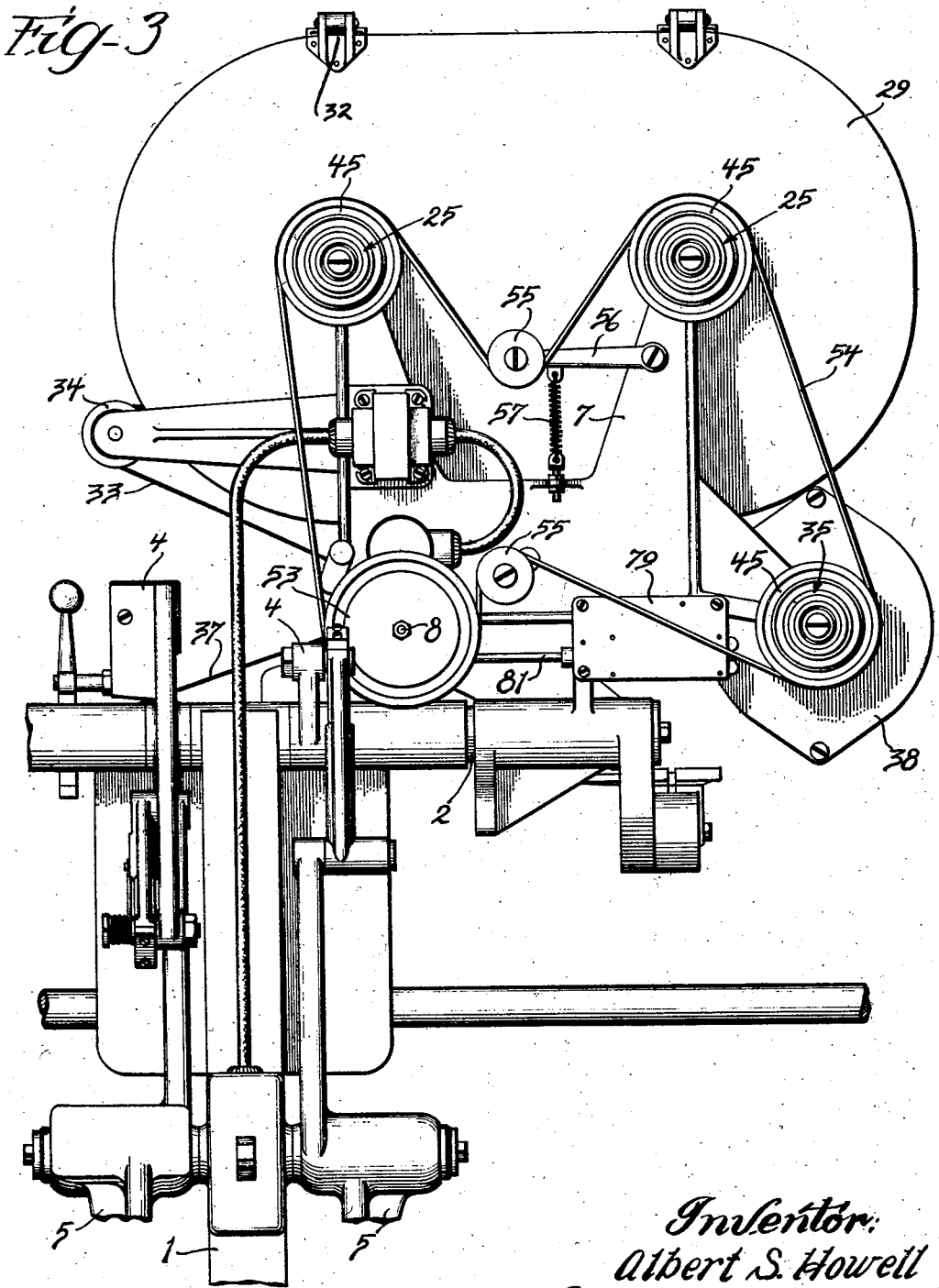

March 19, 1935.  A. S. HOWELL  1,994,913
FILM MEASURING AND SPLICING MACHINE
Filed Aug. 25, 1931   5 Sheets-Sheet 4
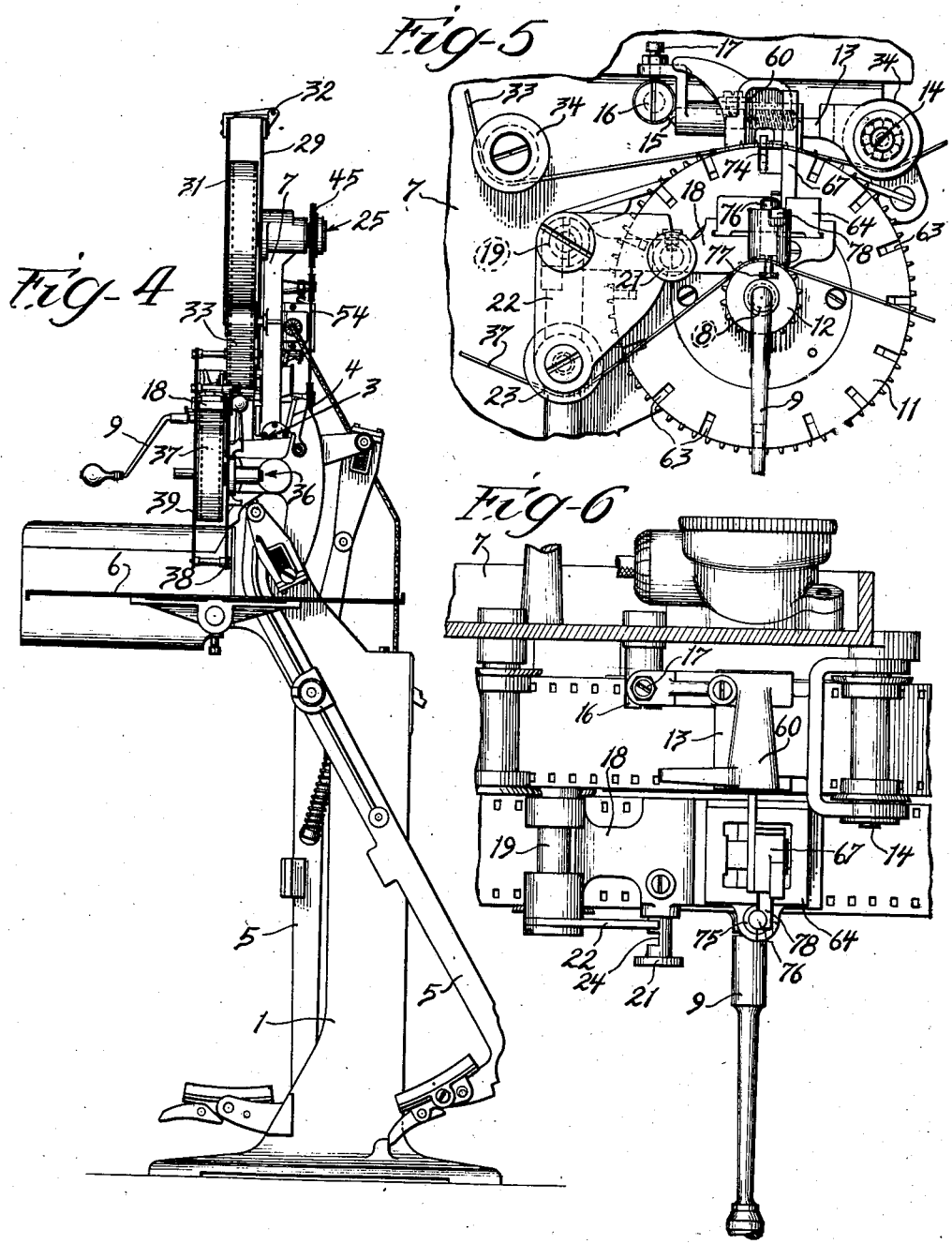
Inventor
Albert S. Howell
By Miehle & Miehle
Atty's.

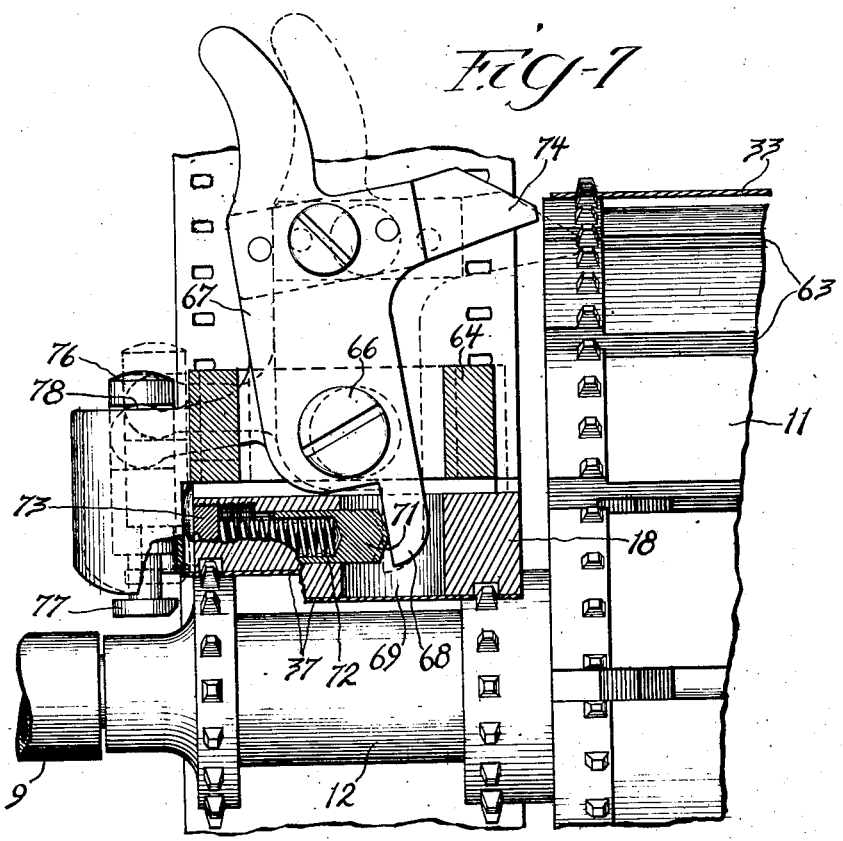
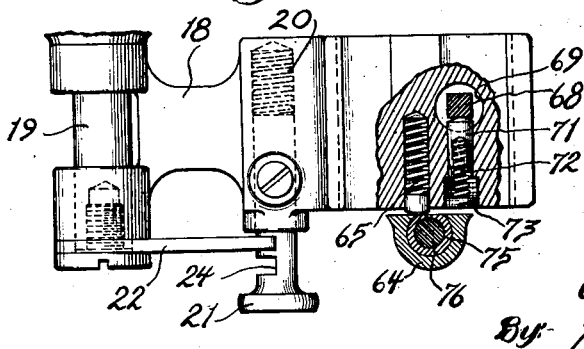

Patented Mar. 19, 1935

1,994,913

UNITED STATES PATENT OFFICE 1,994,913

FILM MEASURING AND SPLICING MACHINE

Albert S. Howell, Chicago, Ill., assignor to The Bell & Howell Company, Chicago, Ill., a corporation of Illinois Application August 25, 1931, Serial No. 559,250

5 Claims. (Cl. 164—89)

My invention relates particularly to a film measuring and splicing machine which is particularly adapted for the production of light control elements or film for motion picture film printing machines of the type described and claimed in my co-pending application for U. S. Letters Patent, Serial No. 461,331, filed June 16, 1930, for improvement in Photographic printing machine, and has for its general object the provision of a film measuring and splicing machine, particularly adapted for the above purpose, by which different sections of film may be accurately measured from another film, say a developed negative motion picture film, and spliced together in an expeditious and convenient manner.

With this object in view my invention consists in certain features of novelty in the construction, combination, and arrangement of parts by which the said object and certain other objects, hereinafter appearing, are effected, all as fully described with reference to the accompanying drawings and more particularly pointed out in the appended claims.

In the said drawings—

Figure 2 is a partial section on the line 2—2 of Figure 1;

Figure 3 is a rear elevation of the upper portion of the machine;

Figure 4 is a side elevation of the machine;

Figure 5 is an enlarged view in front elevation of the film feeding mechanism of the machine; and Figure 6 is a partial top plan view from the line 6—6 of Figure 1;

Figure 7 is an enlarged partial side elevation of the feed sprocket of the machine, showing one of the film retaining gates thereof and associated apparatus partially broken away and shown in section; and Figure 8 is a top plan view of the aforesaid film retaining gate and associated apparatus partially broken away and shown in section.

Like characters of reference indicate like parts in the several views.

Figure 1:
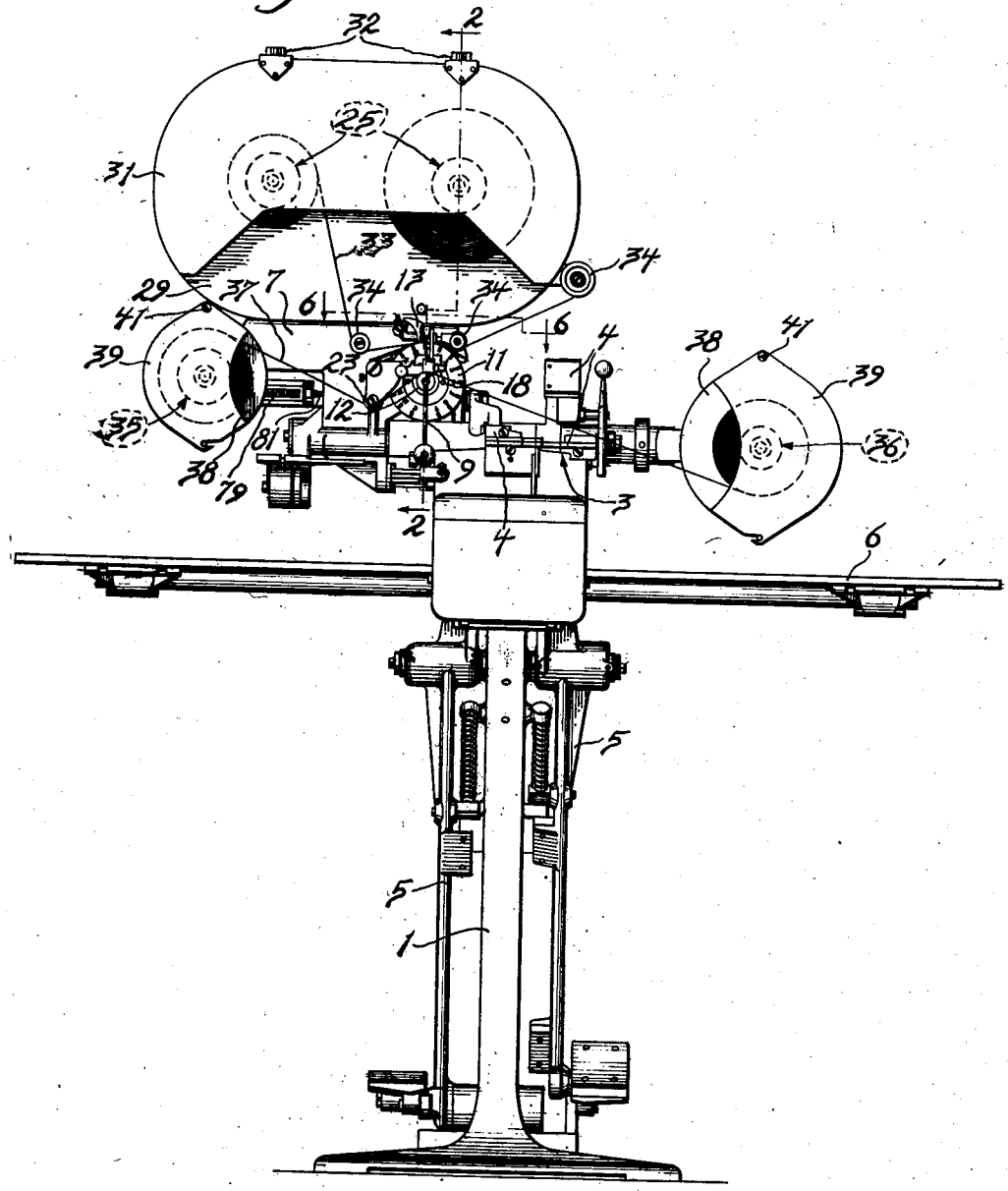
Figure 1 is a front elevation of a film measuring and splicing machine embodying my invention.

Referring to the drawings, 1 designates a self supporting pedestal at the upper end of which is mounted a transverse stationary bar 2. See Figures 1, 2 and 3. Associated with the upper end of the pedestal 1 is a splicing apparatus, generally indicated at 3, which is similar to that disclosed and claimed in U. S. Letters Patent No. 1,275,431, for Improvement in splicing apparatus for cinematographic films, issued August 13, 1918 upon application filed by me, and which is inclusive of clamping jaws 4 pivoted on the bar 2 and controlled by foot operated lever devices, generally indicated at 5, the pedestal also carrying a work table 6 adjacently spaced below the bar 2 and splicing apparatus.

Secured on one end of the bar 2 and extending upwardly therefrom, is a frame 7, which carries a revoluble horizontally disposed forwardly and rearwardly extending shaft 8, upon the front end of which, a hand crank 9 is detachably mounted for the manual rotation of the shaft. See Figures 1 and 2.

Secured on the shaft 8 forwardly of the frame 7 for rotation with the shaft, is a double sprocket consisting of an inner section 11 of relatively large diameter and an outer section 12 of relatively small diameter. See Figures 2 and 5.

A film gate 13 is pivotally mounted, as designated at 14, on the frame 7 for movement into and out of film retaining relation with the large sprocket section 11 in overlying relation therewith, a spring pressed plunger 15 on the gate engaging a stud 16 on the frame 7 to retain the film gate in film retaining position, and an adjustable stop screw 17, mounted on the gate, engaging downwardly on the stud 16 to determine the film retaining position of the gate. See Figures 2, 5 and 6.

A second film gate 18 is pivotally mounted on a stud 19, mounted on the frame 7, for movement into and out of film retaining relation with the small sprocket section 12 in overlying relation therewith. This gate is retained in film retaining position by means of a plunger 21 pressed outwardly by a spring 20, mounted on the gate 18, engaging the notched edge of a plate 22 which is secured on the stud 19 and the stud of a film roller 23 spaced below the stud 19, the plunger 21 being provided with a slot 24 which, when the plunger is pressed inwardly, alines with the plate 22 to clear the same for the movement of this gate into and out of film retaining position.

The upper portion of the frame 7 is provided with film feed and take up spindle structures, generally indicated at 25, which are inclusive of revoluble shafts 26 provided with bushings 27 on which are detachably mounted film spools 28 adapted to carry film rolls. See Figures 2 and 3. These spindle structures are provided with a back guard plate 29 secured to the frame 7 and a front guard plate 31 hinged to the back guard plate, as designated at 32, for the installation and removal of film rolls on the spools.

These film spools are disposed in the plane of the larger sprocket section 11 for the feeding of a film 33 to and from this sprocket section, guide rollers 34 being provided for guiding the film, and one of these rollers being associated with the pivot structure 14. See Figures 1, 2 and 4.

Mounted on the frame 7 and arranged below the aforesaid spindle structure 25 and disposed beyond the side of the feed sprocket opposite that on which the splicing apparatus 3 is disposed, is an additional take up spindle structure, generally designated at 35, which is similar to the spindle structures 25. See Figures 1 and 3.

Mounted on the bar 2 and arranged beyond the other side of the feed sprocket and disposed so that the splicing apparatus 3 lies between it and the feed sprocket, is a feed spindle structure, generally designated at 36. See Figures 1 and 4. The spindle structures 35 and 36 are disposed in the plane of the smaller sprocket section 12 for the feeding of a second film 37 to and from this sprocket section, and are provided with back guard plates 38 and front guard plates 39 pivoted at 41 for the installation and removal of rolls of the film 37 on the spindle structures 35 and 36.

Each of the spindle structures 25 and 35 is provided with an overrunning clutch and friction driving device which consists as follows. See Figure 2.

Secured on the rear end of each shaft 26 is a cylindrical member 42, and also secured on each shaft immediately inward of the member 42 is a bushing 43. A cylindrical member 44 is rotatably mounted on the bushing 43, and a bored pulley 45 is rotatably mounted on the cylindrical member 44. A spring brake coil 46 surrounds the cylindrical member 42 and has one end thereof secured with the cylindrical member 44, so that rotation of the bushing 44 in one direction serves to tighten the coil 46 about the cylindrical member 42 to drive the same and the shaft 26, while rotation of the bushing 44 in the opposite direction loosens the coil from the member 42 so that the member 42 and the shaft 26 are not driven in the latter direction.

Thus is formed a one way clutch or drive means for the film rolls of the spindle structures 25 and 35.

Arranged on the hub of the pulley 45 for rotation with respect thereto is a friction clutch member 47 which is rotatably secured with the bushing 44 by means of a radial pin 48 on this bushing engaging an end slot in the hub of the clutch member. A coiled compression spring 49 is disposed between the clutch member 47 and an annular member 51, screwthreaded on the bushing 44 and secured in adjusted position thereon by a lock nut 52, and presses the friction member 47 against the web of the pulley 45 to form a friction drive connection between the pulley and the bushing 44.

Thus is provided a one way frictional drive means between each pulley 45 and its associated shaft 26 for winding the film on the rolls of the spools 28.

Secured on the rear end of the shaft 8 is a driving pulley 53, see Figures 2 and 3, and a belt 54 is trained over the pulleys 53 and 45 for driving the pulleys 45 from the shaft 8. The belt 54 is also trained over idler pulleys 55, the upper of which is mounted on an arm 56 pivoted on the frame 7 and pulled by a spring 57 in the direction to tension the belt 54.

The spring brake coils 46 are so arranged that, when the feed sprocket is rotated in the direction to feed the film to the left in Figure 1, which is the normal direction of operation thereof, the spools 28 of the left hand spindle structure 35 and the spindle structure 35 are driven to take up the film fed thereto, the right hand spindle structure 25 being free to feed the film 33 to the sprocket. Opposite rotation of the feed sprocket free the spools of the left hand spindle structure 25 and the spindle structure 35 while the spool of the right hand spindle structure 25 is driven to take up the film 33, the hereinbefore described friction drive connection from the pulleys 45 accommodating for the varying diameters of the rolls of film on the spools 28 of the spindle structures 25 and 35.

The double feed sprocket feeds the films 33 and 37 in synchronism, the film 33 being fed faster than the film 37, and in the use of the machine to produce light control elements or films as hereinbefore mentioned, the higher speed film 33 is a developed negative film and the slower speed film 37 is the printing light control film produced for the photographic printing of positive films from the film 33, the film 37 being produced by splicing sections of exposed and developed film of different densities, so that the printing light controlled by the film 37 is varied during the printing from the film 33 to effect the desired densities of the different sections of the positive films printed from the film 33.

Accordingly, the feeding of the films 37 and 33 in synchronism conveniently provides for the determining or locating from the film 33 of points on the film 37 for the cutting of the film 37 and the splicing of other film of different densities therewith to form parts thereof, the different sections of the film 37 being proportionate in length to the corresponding sections of the film 33.

It is not necessary that the spindle structure 36 be driven, as it is from sections of rolls of film interchangeably carried on this spindle structure that the film 37 is assembled.

The large sprocket section 11 is hollow, as will be seen in Figure 2, and arranged therein is a small incandescent electric lamp 58 which is carried in a suitable socket structure 59 mounted on the frame 7. A suitable stationary shield 61 is carried within the sprocket section 11 and surrounds the lamp 58 and is provided with an upwardly arranged opening 62 through which light passes upwardly and forwardly.

The sprocket section 11 is provided with transverse slots 63 through the peripheral wall thereof, which are equally spaced and which are preferably spaced the distance of a picture frame longitudinally of the film 33, so that when the film 33 is properly laced on the sprocket section 11 each picture frame division of the film 33 will overlie a slot 63.

The gate 13 is provided with an upwardly and forwardly extending light passage formation 60 through which the film 33 may be observed at the top of the sprocket for the observation of the density thereof and the observance of the density thereon where the density varies, the light from the lamp 58 passing through the slots 63 providing illumination.

In the operation of the machine the films are faced on the machine with a control film of the proper density for the first section of the film 37 laced on the small sprocket section 12. The films are fed by rotating the feed sprocket until the density of the film 33 changes, say at a change of scene. This point is located on the film 37 and it is cut at that point, and other film of the proper density for the next section or scene of the film 33 is spliced on the film 37 in the splicing apparatus 3 to form part of the film 37. This operation is repeated until the film 37 is completely assembled, film rolls of the desired densities being interchangeably mounted on the spindle structure 36 as the operation proceeds.

In order to accurately and conveniently mark the film 37 at the points where it is to be spliced the following is provided.

Slidably mounted on the gate 18 for movement transversely thereof, is a slide block 64, and a spring device 65 carried in a bore in this gate serves to move the slide block forwardly. See Figures 2, 5, 6, 7 and 8. Pivotally mounted by means of a stud 66 on the slide block for movement corresponding with the movement of the slide block, is a manually actuated lever 67.

The lever 67 is provided with a finger 68 projecting downwardly into an aperture 69 through the gate 18, and this finger is engaged by an adjustable relatively strong yieldable stop device comprising a stud 71 slidably mounted in a transverse bore in the gate 18 and engageable rearwardly against the finger 68, and a compression spring 72 engageable rearwardly against the stud 71 and reacting against a plug 73 adjustably screwthreaded into the last mentioned bore in the gate 18.

The lever 67 is provided with a rearwardly projecting lock finger 74, which, when the lever 67 is moved rearwardly from its normal position, engages into any one of the slots 63 and thereby locks the feed sprocket against rotation. The normal position of the lever 67, in which the lock finger 74 is not engaged with one of the slots 63 is shown in Figures 2, 6 and 7, while the rearward position of the lever is shown in broken lines in Figure 7.

Arranged at the front of the slide block 64 is a vertically disposed punch consisting of a bushing 75 secured in a bore in the slide block and a stud 76 slidably mounted in the bushing and reduced adjacent its lower end to form a cutter head 77 at its lower end cooperating with the lower end of the bushing 75 to cut a notch in the forward edge of the film 37, when the slide block 64 is in its rearward position, with upward movement of the stud, the head 77 clearing the film 37 when the slide block is in its normal forward position, as shown in Figures 2 and 7, so that the gate 18 may be opened without interference.

The lever 67 is provided with a forwardly extending arm 78, the forward end of which is engaged in a transverse slot in the stud 76 adjacent its upper end, whereby the stud is operated upwardly for cutting with rearward pivotal movement of the lever 67.

The arrangement is such that rearward movement of the lever 67 causes the finger 68 to rock on the stud 71, whereby the lever pivots on the stud 66 and moves the slide block 64 rearwardly.

Initial rearward movement of the lever 67 engages the lock finger 74 in a slot 63 of the feed sprocket to lock it. When the slide block reaches the rearward end of its movement the head 77 of the stud 76 underlies the forward edge of the film 37, the rearward position of the slide block being determined by the punch structure thereon engaging against the front side of the gate 18.

Continued rearward movement of the lever 67 causes it to pivot on the stud 66 and compress the spring 72, and this final rearward movement of the lever causes the punch to cut a notch in the edge of the film 37. The spring device 65 and the spring 72 cause the mechanism to return to its normal position upon release of the lever 67.

Thus, is the film 37 accurately and conveniently marked for cutting to splice other film thereon to form parts thereof, and after the film is notched, the notched part is run back to the splicing apparatus 3, which is desirably disposed between the feed sprocket and the spindle structure 36, and cut and spliced.

A film footage recorder 79 is mounted on the frame 7 and is driven by a shaft 81 which in turn is driven from the feed sprocket shaft 8 by spiral gearing 82 disposed within the frame 7, for recording the film footage run on the feed sprocket. See Figures 1, 2 and 3.

While I have described and shown the preferred embodiment of my invention I do not wish to be limited to the precise details of construction as changes may readily be made without departing from the spirit of my invention, but having thus described my invention, I claim as new and desire to secure by Letters Patent the following:

1. In a device of the character described the combination with a revoluble double film sprocket adapted for the synchronous feeding of two films engaged thereon and having one portion thereof hollow and provided with angularly spaced transverse slots through the peripheral wall thereof and adapted for the passage of light outwardly therethrough, and a member movable into engagement with said slots selectively dependent upon the angular positioning of said sprocket for locking the sprocket angularly.

2. In a device of the character described the combination with a revoluble double film sprocket adapted for the synchronous feeding of two films engaged thereon and having the two sections thereof of different diameters and having the larger section thereof hollow and provided with angularly spaced transverse slots through the peripheral wall thereof and adapted for the passage of light outwardly therethrough, and a device movable into engagement with said slots selectively depending upon the angular position of said sprocket and for marking a film on the small sprocket section while so engaged.

3. In a device of the character described the combination with a toothed feeding device, of a film gate for retaining a perforated film in operative relation with said feeding device and mounted for movement substantially normal to the plane of the film into and out of film retaining relation with said feeding device, and a punch carried with said gate for sliding movement with reference thereto and transversely of the film into and out of operative relation with an edge of the film when the gate is in its film retaining position.

4. In a device of the character described the combination with toothed means for feeding two perforated films in synchronism, of a member mounted for sliding movement transversely of one of said films, a member pivoted on said slide member for movement corresponding with the movement thereof, a stop formation on said pivoted member and movable with said pivoted member in one direction into position to lock said feeding means, spring means yieldably urging said slide member in the opposite direction, a punch on said slide member and movable into operative relation with said one film with positioning of said slide member at the end of its movement in said first mentioned direction, a relatively strong yieldable stop device operative upon said pivoted member to oppose pivotal movement thereof in said first mentioned direction, and an operative connection between said pivoted member and said punch whereby said punch is operated with pivotal movement of said pivoted member against said stop device in said first mentioned direction while said slide member is in said position and while said stop formation is in locking position.

5. In a device of the character described the combination with a revoluble double sprocket having the two sections thereof of different diameters and having the larger section thereof provided with angularly spaced slots, of a film gate for retaining a film on the smaller section of said sprocket, a member mounted for sliding movement on said gate transversely of the film on the sprocket, a manually actuated member pivoted on said slide member for movement corresponding with the movement thereof, a stop formation on said pivoted member and movable with said pivoted member in one direction into position to engage any one of said slots to lock said sprocket angularly, spring means reacting on said gate for yieldably urging said slide member in the opposite direction, a punch on said slide member and movable into operative relation with an edge of a film on the smaller section of said sprocket with positioning of said slide member at the end of its movement in said first mentioned direction, a relatively strong yieldable stop device reacting on said gate and operative on said pivoted member to oppose pivotal movement thereof in said first mentioned direction, and an operative connection between said pivoted member and said punch whereby said punch is operated with pivotal movement of said pivotal member against said stop device in said first mentioned direction while said slide member is in said position and while said stop formation is in locking position.

ALBERT S. HOWELL.